United States Patent
Lee (10) Patent No.: US 10,389,510 B2
(45) Date of Patent: Aug. 20, 2019

(54) SELF-INTERFERENCE SIGNAL CANCELLATION APPARATUS AND TRANSCEIVER INCLUDING THE SAME

(71) Applicant: ELECTRONICS AND TELECOMMUNICATIONS RESEARCH INSTITUTE, Daejeon (KR)

(72) Inventor: Sung Jun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 56 days.

(21) Appl. No.: 15/657,087

(22) Filed: Jul. 21, 2017

(65) Prior Publication Data
US 2018/0026776 A1   Jan. 25, 2018

(30) Foreign Application Priority Data

Jul. 22, 2016 (KR) .................. 10-2016-0093695
May 16, 2017 (KR) .................. 10-2017-0060635

(51) Int. Cl.
  *H04L 5/14* (2006.01)
  *H04B 1/48* (2006.01)
  *H04B 1/525* (2015.01)

(52) U.S. Cl.
  CPC ............. *H04L 5/1461* (2013.01); *H04B 1/48* (2013.01); *H04B 1/525* (2013.01); *H04B 2001/485* (2013.01)

(58) Field of Classification Search
  None
  See application file for complete search history.

(56) References Cited

U.S. PATENT DOCUMENTS

| | | | |
|---|---|---|---|
| 5,886,986 A | 3/1999 | Lee et al. | |
| 2013/0286903 A1* | 10/2013 | Khojastepour | H04L 5/14 370/280 |
| 2014/0169236 A1 | 6/2014 | Choi et al. | |
| 2016/0087698 A1 | 3/2016 | Chang et al. | |
| 2016/0139256 A1* | 5/2016 | Ferguson | G01S 7/023 342/122 |
| 2016/0380670 A1* | 12/2016 | Liu | H01P 1/213 455/73 |
| 2017/0019132 A1* | 1/2017 | Baker | H04B 1/0475 |
| 2017/0104506 A1* | 4/2017 | Liu | H04B 1/1027 |

(Continued)

OTHER PUBLICATIONS

Dinesh Bharadia et al., "Full Duplex Radios", SIGCOMM'13, Hong Kong, China, Aug. 12-16, 2013, pp. 375-386.

*Primary Examiner* — Ayaz R Sheikh
*Assistant Examiner* — Faiyazkhan Ghafoerkhan
(74) *Attorney, Agent, or Firm* — Rabin & Berdo, P.C.

(57) ABSTRACT

An apparatus for canceling a self-interference signal and a transceiver including the same are disclosed. The transceiver may include an antenna; a circulator transmitting a portion of a transmit signal to the antenna and transmitting a receive signal received through the antenna to a receiver; and a self-interference signal canceling unit receiving a first signal, which is a portion of the transmit signal, and physically copying a self-interference signal generated by the antenna and the circulator to generate an estimation signal of the self-interference signal.

3 Claims, 5 Drawing Sheets

(56) References Cited

U.S. PATENT DOCUMENTS

2017/0111155 A1\* 4/2017 Liu .......................... H04B 1/10
2017/0222733 A1\* 8/2017 Baker .................. H04B 1/0475
2017/0339569 A1\* 11/2017 Khandani ............. H04W 16/14

\* cited by examiner

SELF-INTERFERENCE SIGNAL CANCELLATION APPARATUS AND TRANSCEIVER INCLUDING THE SAME

CROSS-REFERENCE TO RELATED APPLICATION

This application claims priority to and the benefit of Korean Patent Application No. 10-2016-0093695 and 10-2017-0060635 filed in the Korean Intellectual Property Office on Jul. 22, 2016 and May 16, 2017, the entire contents of which are incorporated herein by reference.

BACKGROUND OF THE INVENTION

(a) Field of the Invention

The present invention relates to an apparatus for canceling a self-interference signal and a transceiver including the same.

(b) Description of the Related Art

In recent, a wireless communication system mainly uses a half-duplex mode that separates a transmit signal and a receive signal in a time domain, or an out-of-band full-duplex mode that separates the transmit signal and the receive signal in a frequency domain. These modes are adopted because reception performance is degraded due to the transmit signal leaked into a receiver when the transmit signal and the receive signal are not separated.

If the transmit signal leaked into the receiver may be reduced to below a level allowed by a system, it is possible to implement a system of an in-band full duplex (IFD) mode that performs a transmit operation and a receive operation using the same frequency at the same time. The in-band full duplex mode (IFD) may theoretically achieve a double increase in link capacity compared to conventional wireless communication systems.

The simplest and obvious method for reducing the transmit signal leaked into the receiver in the system of the in-band full duplex (IFD) mode is to use separately a transmit antenna and a receive antenna and to space sufficiently an interval between the two antennas. However, there is a problem in that it is difficult for most communication systems or devices to accommodate the interval between the transmit and receive antennas required for an in-band full duplex (IFD) mode operation.

Meanwhile, a radar system sometimes has to perform a transmit operation and a receive operation using the same frequency at the same time to detect a target. Since the in-band full duplex (IFD) mode is a prerequisite not an option in the above-mentioned radar system, the transmit antenna and the receive antenna should be separated as necessary for the in-band full duplex (IFD) mode operation. Therefore, the radar system should endure operation costs corresponding thereto, for example, a system installation space, and the like.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus for effectively canceling a self-interference signal.

An exemplary embodiment of the present invention provides a transceiver. The transceiver may include an antenna; a first circulator transmitting a portion of a transmit signal to the antenna and transmitting a receive signal received through the antenna to a receiver; and a self-interference signal canceling unit receiving a first signal, which is a portion of the transmit signal, and physically copying a self-interference signal generated by the antenna and the first circulator to generate an estimation signal of the self-interference signal.

The self-interference signal canceling unit may include a second circulator having the same characteristics as the first circulator; and a load generator connected to the second circulator and physically copying the input impedance of the antenna.

The self-interference signal canceling unit may further include a signal shifter that adjusts magnitude of an output signal of the second circulator, so as to compensate for a magnitude difference between the self-interference signal and the estimation signal of the self-interference signal.

The self-interference signal canceling unit may further include a phase shifter that adjusts a phase of an output signal of the second circulator so that the estimation signal of the self-interference signal is canceled from the signal inputted to the receiver through the antenna and the first circulator.

The self-interference signal canceling unit may further include a transmission line that generates a time delay in an output signal of the second circulator, so as to compensate for a time delay difference between the self-interference signal and the estimation signal of the self-interference signal.

The load generator may include a transmission line having a predetermined length and a matching network having a predetermined impedance value, and input impedance by the transmission line and the matching network may physically copy the input impedance of the antenna.

The transceiver may further include a divider receiving the transmit signal and separating the first signal from the transmit signal to transmit the first signal to the self-interference signal canceling unit; and a combiner combining the signal inputted to the receiver through the antenna and the first circulator with the estimation signal of the self-interference signal.

The divider and the combiner may be RF couplers.

Another embodiment of the present invention provides an apparatus for canceling a self-interference signal generated by an antenna and a first circulator, in a transceiver including the antenna, and the first circulator transmitting a portion of a transmit signal to the antenna and transmitting a receive signal received through the antenna to a receiver. The apparatus may include a second circulator receiving a first signal, which is a portion of the transmit signal, and physically copying the first circulator to output a second signal; and a load generator connected to the second circulator and showing input impedance of the antenna.

The apparatus may further include a signal shifter adjusting magnitude of the second signal.

The apparatus may further include a phase shifter adjusting a phase of the second signal.

The apparatus may further include a transmission line generating a time delay in the second signal.

The load generator may include a transmission line having a predetermined length and a matching network having a predetermined impedance value, and input impedance by the transmission line and the matching network may physically copy the input impedance of the antenna.

The apparatus may further include a divider receiving the transmit signal and separating the first signal from the transmit signal to output the first signal to the second circulator; and a combiner combining the signal inputted to the receiver through the antenna and the first circulator with a signal corresponding to the second signal.

Yet another embodiment of the present invention provides a transceiver. The transceiver may include a first antenna transmitting a portion of a transmit signal; a second antenna positioned to be spaced apart from the first antenna by a first length and receiving a receive signal; and a self-interference signal canceling unit receiving a first signal, which is a portion of the transmit signal, and physically copying a self-interference signal generated by the first length to generate an estimation signal of the self-interference signal.

The transceiver may further include a divider receiving the transmit signal and separating the first signal from the transmit signal to transmit the first signal to the self-interference signal canceling unit; and a combiner combining the second signal inputted through the second antenna with the estimation signal of the self-interference signal.

The self-interference signal canceling unit may include a transmission line having a predetermined length by considering a second length, which is a physical length between the divider and the first antenna, a third length, which is a physical length between the second antenna and the combiner, and the first length.

The self-interference signal canceling unit may further include a signal shifter that adjusts magnitude of the first signal, so as to compensate for a magnitude difference between the self-interference signal and the estimation signal of the self-interference signal. The self-interference signal canceling unit may further include a phase shifter that adjusts a phase of the first signal so that the estimation signal of the self-interference signal is canceled from the second signal.

According to an embodiment of the present invention, it is possible to cancel the self-interference signal by physically copying causes generating the self-interference signal in the in-band full duplex (IFD) mode to generate an estimation signal of the self-interference signal and subtracting the estimation signal of the self-interference signal from the self-interference signal.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a transceiver may refer to a terminal, a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), a radar, or the like, and may also include functions of all or some of the MT, the MS, the AMS, the HR-MS, the SS, the PSS, the AT, the UE, the radar, or the like.

In addition, the transceiver may refer to a base station (BS), an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as the base station, a high reliability relay station (HR-RS) serving as the base station, or the like, and may also include all or some of the functions of BS, the ABS, the nodeB, the eNodeB, the AP, the RAS, the BTS, the MMR-BS, the RS, the HR-RS, or the like.

Figure 1:
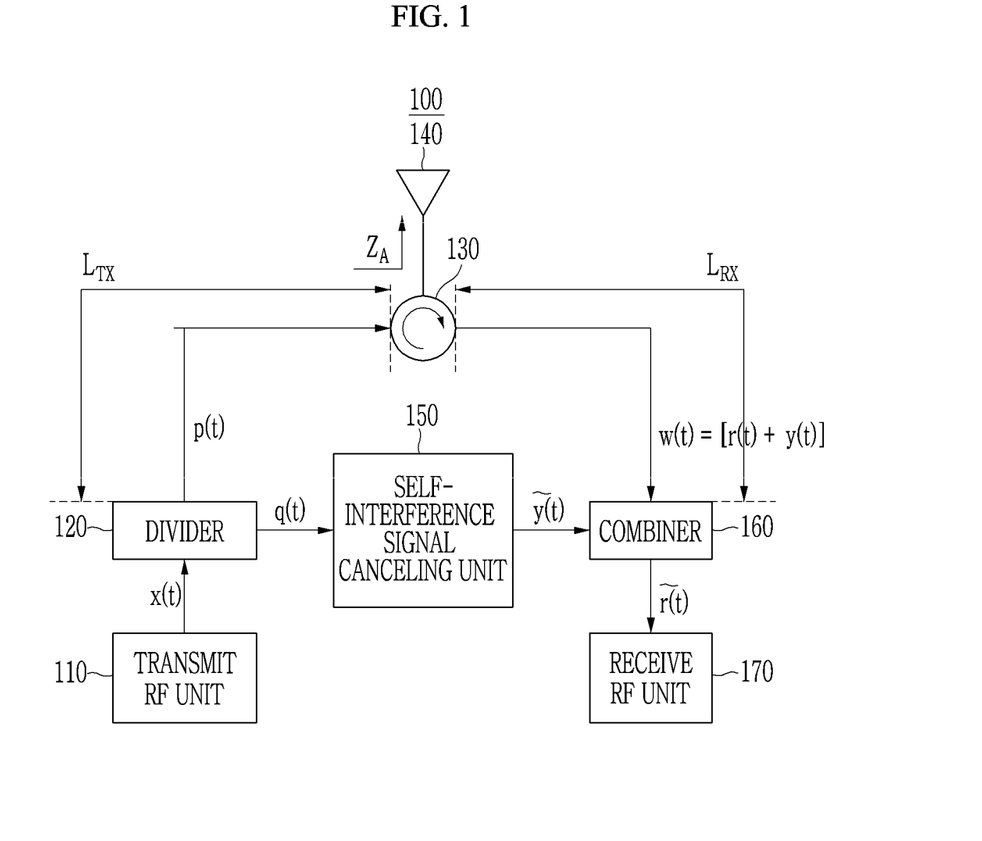
FIG. 1 is a drawing illustrating a transceiver according to an exemplary embodiment of the present invention.

FIG. 1 is a drawing illustrating a transceiver 100 according to an exemplary embodiment of the present invention. The transceiver 100 illustrated in FIG. 1 may be operated in an in-band full duplex (IFD) mode.

As illustrated in FIG. 1, the transceiver 100 according to an exemplary embodiment of the present invention includes a transmit RF unit 110, a divider 120, a circulator 130, an antenna 140, a self-interference signal canceling unit 150, a combiner 160, and a receive RF unit 170. In FIG. 1, transmit and receive baseband (referred to as BB) units to be connected to the transmit and receive RF units 110 and 170 were omitted.

The transmit RF unit 110 receives a baseband signal from the transmit BB unit and converts the baseband signal into a transmit signal for a wireless transmission. In FIG. 1, the transmit signal generated by the transmit RF unit 110 is denoted as x(t).

The divider 120 divides the transmit signal x(t) generated by the transmit RF unit 110 into two signals and transmits the two signals to the circulator 130 and the self-interference signal canceling unit 150, respectively. In FIG. 1, the signals divided by the divider 120 are denoted as a first transmit distribution signal p(t) and a second transmit distribution signal q(t). Such a divider 120 may be implemented as a RF coupler.

The circulator 130 receives the first transmit distribution signal p(t) from the divider 120 and transmits the first transmit distribution signal p(t) to the antenna 140. The circulator 130 transmits a receive signal r(t) received by the antenna 140 to the receive RF unit 170. That is, the circulator 130 serves to transmit the receive signal r(t) to a receiver at the same time of transmitting the first transmit distribution signal p(t) to the antenna 140 while having directivity.

The antenna 140 simultaneously performs a transmit function as well as a receive function. That is, the first transmit distribution signal p(t) is transmitted via the antenna 140 and the receive signal r(t) is received via the antenna 140. In FIG. 1, input impedance of the antenna 140 is denoted as $Z_A$.

Meanwhile, in FIG. 1, the signals inputted through the antenna 140 and the circulator 130 are denoted as w(t). Here, w(t) includes the receive signal r(t) of the transceiver 100, and a self-interference signal y(t). The self-interference signal is denoted as y(t).

The self-interference signal canceling unit 150 receives the second transmit distribution signal q(t) from the divider 120 and generates an estimation signal ỹ(t) of self-interference signal. The self-interference signal canceling unit 150 according to an exemplary embodiment of the present invention physically copies causes generating the self-interference signal to generate the estimation signal of the self-interference signal, which will be described in detail with reference to FIG. 2.

In FIG. 1, $L_{TX}$ denotes a physical length of a transmission line up to the circulator 130 from the divider 120, and $L_{RX}$ denotes a physical length of a transmission line up to the combiner 160 from the circulator 130. The roles thereof will be described in detail with reference to FIG. 2.

The combiner 160 combines the signal w(t) inputted through the antenna 140 and the circulator 130 with the estimation signal ỹ(t) of the self-interference signal to output an estimation signal r̃(t) of the receive signal r(t). That is, the combiner 160 subtracts ỹ(t) from w(t) to output r̃(t). Such a combiner 160 may be implemented as a RF coupler.

The receive RF unit 170 receives the estimation signal r̃(t) of the receive signal r(t) from the combiner 160, converts the estimation signal r̃(t) into the baseband signal, and transmits the converted baseband signal to the receive BB unit. That is, the receive RF unit 170 receives a receive signal from which the self-interference signal is canceled.

The self-interference signal y(t) received with being mixed with the receive signal r(t) may be expressed as in Equation 1.

$$y(t)=[y_{IN}(t)+y_{OUT}(t)]$$

$$y_{IN}(t)=h_{IN}(\tau,t)*x(t) \qquad \text{[Equation 1]}$$

In Equation 1, $y_{IN}(t)$ means a self-interference signal generated by characteristics of the circulator 130 and the antenna 140. Since isolation characteristics of the circulator 130 are not ideal, a portion of the first transmit distribution signal p(t) may be leaked into the receive RF unit 170. In addition, due to reflection coefficient characteristics of the antenna 140 which are not ideal, a portion of the first transmit distribution signal p(t) is reflected from the antenna 140 and leaked into the receive RF unit 170. The above-mentioned signals are all self-interference signals, which are denoted as $y_{IN}(t)$. As in Equation 1, $y_{IN}(t)$ may be denoted by convolution of a channel impulse response $h_{IN}(\tau,t)$ and x(t). In addition, $y_{OUT}(t)$ means a signal that the first transmit distribution signal p(t) is outputted through the antenna 140 and is then again received through the antenna 140 after an electric wave scattering (a reflection by peripheral objects, or the like). Such $y_{OUT}(t)$ is a signal to be canceled in a digital stage after a receive analog to digital conversion (ADC). Therefore, the self-interference signal considered by the self-interference signal canceling unit 150 according to an exemplary embodiment of the present invention is $y_{IN}(t)$. Hereinafter, in the present specification, $y_{IN}(t)$ will be expressed as y(t) for convenience of explanation.

The self-interference signal y(t) is generated by characteristics of the circulator 130 and the antenna 140. Accordingly, the self-interference signal canceling unit 150 according to an exemplary embodiment of the present invention physically and directly copies the self-interference signal generated by the circulator 130 and the antenna 140 to generate an estimation signal ỹ(t) of the self-interference signal. This will be described in more detail with reference to FIG. 2.

Figure 2:
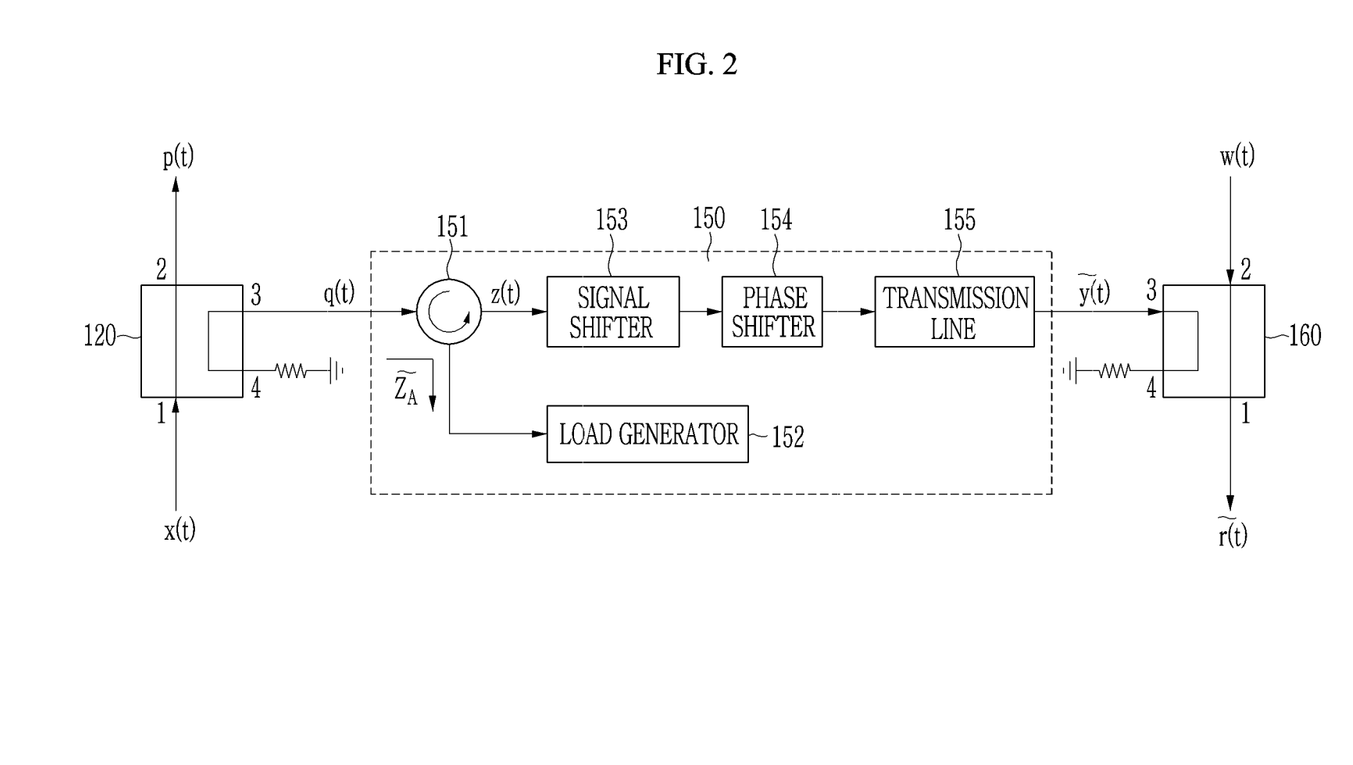
FIG. 2 is a drawing illustrating a self-interference signal canceling unit according to an exemplary embodiment of the present invention.

FIG. 2 is a drawing illustrating the self-interference signal canceling unit 150 according to an exemplary embodiment of the present invention.

As illustrated in FIG. 2, the self-interference signal canceling unit 150 according to an exemplary embodiment of the present invention includes a circulator 151, a load generator 152, a signal shifter 153, a phase shifter 154, and a transmission line 155. The arrangement order of the signal shifter 153, the phase shifter 154, and the transmission line 155 may be changed.

The circulator 151 has the same characteristics as the circulator 130. That is, the circulator 151, which is manufactured in the same method as the circulator 130, may be used.

The load generator 152 is connected to the circulator 151, and has the same input impedance as the antenna 140. In FIG. 1, in correspond with the case that the antenna 140 having the input impedance of $Z_A$ is connected to the circulator 130, the load generator 152 that copies $Z_A$ is connected to the circulator 151. That is, the load generator 152 has the input impedance $\tilde{Z}_A$ that copies the input impedance $Z_A$ of the antenna 140.

Figure 3:
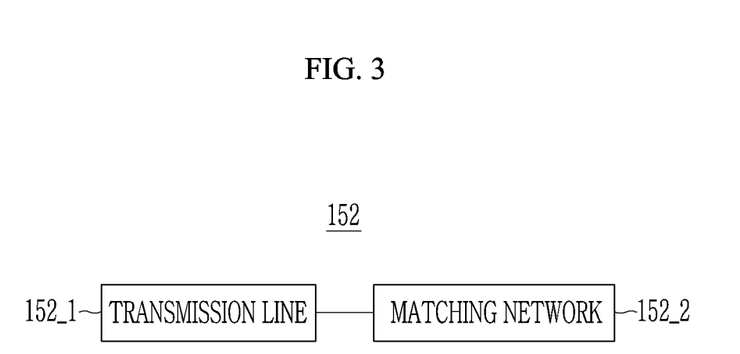
FIG. 3 is a drawing illustrating a load generator according to an exemplary embodiment of the present invention.

FIG. 3 is a drawing illustrating the load generator 152 according to an exemplary embodiment of the present invention.

As illustrated in FIG. 3, the load generator 152 includes a transmission line 152_1 and a matching network 152_2.

The case that the first transmit distribution signal p(t) is reflected by the antenna 140 occurs by a mismatching of the input impedance $Z_A$ of the antenna 140 and system impedance (e.g., 50 ohm), only in consideration of a steady-state. In order to more accurately copy a reflection phenomenon by the antenna, including a transient-state, the transmission line 152_1 having a predetermined length may be formed in the load generator 152. The transmission line 152_1 may have, for example, 0.25 $\lambda_g$ (where, $\lambda_g$ refers to an guided wavelength of the transmission line at the corresponding frequency) length. Meanwhile, in the case that a desired level of the self-interference signal cancellation may be achieved without using the transmission line 152_1, the transmission line 152_1 may not be used.

The matching network 152_2 is configured so that the input impedance ŽA of the load generator 152 copies the input impedance $Z_A$ of the antenna 140 in consideration of up to an operation of the transmission line 152_1. The matching network 152_2 may basically include a resistor R, an inductor L, and a capacitor C. Here, the matching network 152_2 may further include a varactor, and may provide convenience of adjusting input impedance by adjusting characteristics of the varactor.

In the case that the load generator 152 perfectly copies the input impedance A of the antenna 140, and the characteristics of the circulator 130 and the circulator 151 are the same as each other, a relationship between p(t) and y(t) is the same as a relationship between q(t) and z(t).

Meanwhile, FIG. 2 illustrates the case that the divider 120 and the combiner 160 are implemented as a RF coupler. Here, 1, 2, 3, and 4, which are ports of the RF coupler, denote an input port, a through port, a coupled port, and an isolation port, respectively.

In a process of dividing the transmit signal x(t) generated by the transmit RF unit 110 into the first transmit distribution signal p(t) and the second transmit distribution signal q(t), magnitudes of the first transmit distribution signal p(t) and the second transmit distribution signal q(t) may not be the same as each other. In addition, the first transmit distribution signal p(t) and the second transmit distribution signal q(t) do not pass through a completely same signal path. Thus, the signal shifter 153 amplifies or attenuates magnitude of the output signal z(t) of the circulator 151 so that magnitude of ỹ(t) becomes equal to magnitude of y(t). The signal shifter 153 may be implemented using an amplifier and a variable attenuator.

The phase shifter 154 adjusts a phase so that the estimation signal ỹ(t) of the self-interference signal is canceled from the signal w(t) inputted through the antenna 140 and the circulator 130. In the case that the two couplers 120 and 160 are both '90° couplers', since there is no need to adjust the phase, the phase shifter 154 provides the phase difference of 0° between an input and an output. As another example, in the case that the two couplers 120 and 160 are both '180° couplers', the phase shifter 154 provides the phase difference of 180° between an input and an output.

Meanwhile, the phase difference may exist between an input and an output of the signal shifter 153, and the phase difference of $S_{21}$ and $S_{31}$ in the two couplers 120 and 160 may not be accurately 90° or 180°. Therefore, the phase shifter 154 provides a phase that ỹ(t) is canceled from w(t) by reflecting the above-mentioned contents. For example, in the case that the phase difference of $S_{21}$ and $S_{31}$ in the two couplers 120 and 160 is 170°, and the phase difference of the input and the output of the signal shifter 153 is 90°, the phase shifter 154 provides the phase difference of 110° between the input and the output.

The transmission lines having 'physical lengths' denoted by $L_{TX}$ and $L_{RX}$ in FIG. 1 and the transmission line 155 in FIG. 2 compensate for a difference between a time delay from x(t) to the signal y(t) and a time delay from x(t) to the signal ỹ(t). The signal y(t) and ỹ(t) are not accurately a time delay version of the x(t), but are expressed as in Equations 2 and 3 for convenience of explanation.

$$y(t)=R_a \cdot x(t-\tau_a) \quad \text{[Equation 2]}$$

$$\tilde{y}(t)=R_b \cdot x(t-\tau_b) \quad \text{[Equation 3]}$$

In Equations 2 and 3, a difference between $R_a$ and $R_b$ is compensated by the signal shifter 153 described above. In addition, a difference between $\tau_a$ and $\tau_b$ is compensated by the 'transmission lines having the physical lengths denoted by $L_{TX}$ and $L_{RX}$' and the transmission line 155. The transmit signal x(t) is propagated to a path of the divider 120, the circulator 130, and the antenna 140 to become y(t), and the transmit signal x(t) is propagated to a path of the divider 120 and the self-interference signal canceling unit 150 to become ỹ(t) Accordingly, since y(t) and ỹ(t) have different propagation paths, a difference in the time delays may occur, where the 'transmission lines having the physical lengths denoted by $L_{TX}$ and $L_{RX}$' and the transmission line 155 serve to compensate for the difference between the time delays.

Meanwhile, since the estimation signal ỹ(t) of the self-interference signal is generated by copying the physical phenomenon generating the self-interference signal in FIGS. 1 to 3, there is no need to basically estimate the channel impulse response $h_{IN}(\tau, t)$ in Equation 1. However, in order to be able to estimate $h_{IN}(\tau, t)$, the signal shifter 153 is turned-off by the control of a controller (not shown). That is, by turning-off the signal shifter 153, it is possible to estimate the channel impulse response $h_{IN}(\tau, t)$.

Figure 4:
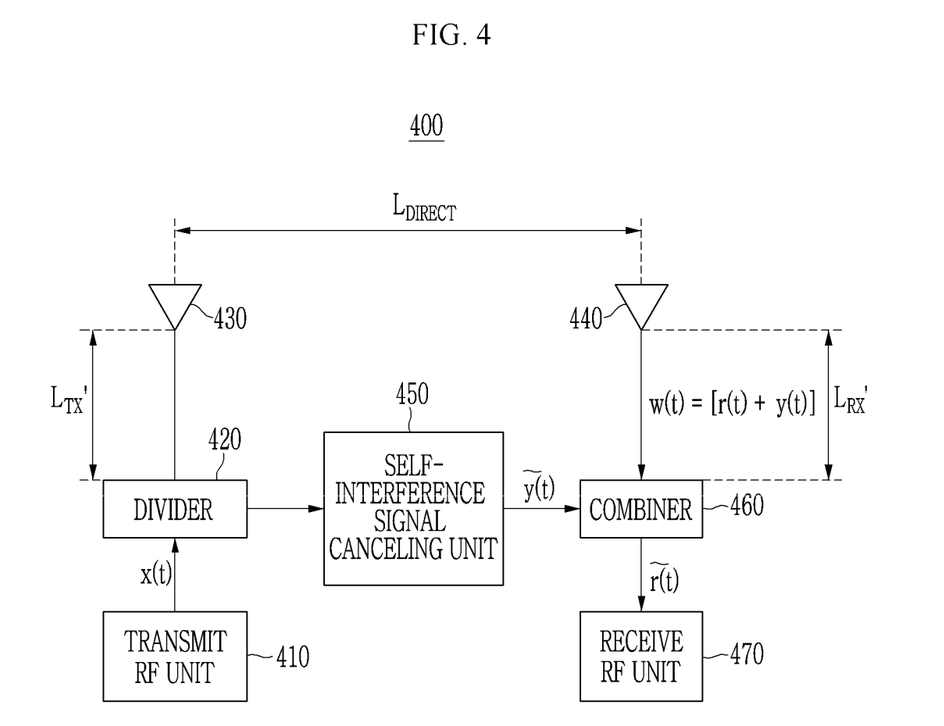
FIG. 4 is a drawing illustrating a transceiver according to another exemplary embodiment of the present invention.

FIG. 4 is a drawing illustrating a transceiver 400 according to another exemplary embodiment of the present invention. The transceiver 400 of FIG. 4 is similar to the transceiver 100 of FIG. 1 except that it is operated in an in-band full duplex (IFD) mode using two antennas.

As illustrated in FIG. 4, the transceiver 400 according to another exemplary embodiment of the present invention includes a transmit RF unit 410, a divider 420, a transmit antenna 430, a receive antenna 440, a self-interference signal canceling unit 450, a combiner 460, and a receive RF unit 470. Since operations of the transmit RF unit 410, the divider 420, the combiner 460, and the receive RF unit 470 in FIG. 4 are the same as the corresponding components of FIG. 1, an overlapped description will be omitted.

Since the transmit antenna 430 and the receive antenna 440 separately exist, the circulator is not used in the transceiver 400 according to another exemplary embodiment of the present invention. A position of the self-interference signal canceling unit 450 of FIG. 4 is the same as the position of the self-interference signal canceling unit 150 of FIG. 1, and a function thereof is also the same as the function of the self-interference signal canceling unit 150 of FIG. 1 in that the causes generating the self-interference signal are physically copied.

However, since the causes generating the self-interference signal in FIG. 1 and the causes generating the self-interference signal in FIG. 4 are different, configurations and operations of the self-interference signal canceling units 150 and 450 are slightly different.

In FIG. 4, $L_{TX}'$ denotes a physical length of a transmission line up to the transmit antenna 430 from the divider 420, and $L_{RX}'$ denotes a physical length of a transmission line up to the combiner 460 from the receive antenna 440. In addition, $L_{DIRECT}$ denotes a physical length up to the receive antenna 440 from the transmit antenna 430.

The self-interference signal y(t) received with being mixed with the receive signal r(t) may be expressed as in Equation 4.

$$y(t)=[y_{DIRECT}(t)+y_{NON\text{-}DIRECT}(t)]$$

$$y_{DIRECT}(t)=h_{DIRECT}(\tau,t)*x(t) \quad \text{[Equation 4]}$$

In Equation 4, $y_{DIRECT}(t)$ means a self-interference signal generated by a direct path between the transmit antenna 430 and the receive antenna 440. $y_{NON\text{-}DIRECT}(t)$ means a self-interference signal generated by paths other than the direct path. As in Equation 4, $y_{DIRECT}(t)$ may be denoted by convolution of a channel impulse response $h_{DIRECT}(\tau,t)$ and x(t). In addition, $y_{NON\text{-}DIRECT}(t)$ means a self-interference signal generated by other paths. Such $y_{NON\text{-}DIRECT}(t)$ is a signal to be canceled in a digital stage after a receive analog to digital conversion (ADC). Therefore, the self-interference signal considered by the self-interference signal canceling unit 450 according to another exemplary embodiment of the present invention is $y_{DIRECT}(t)$. Hereinafter, in the present specification, $y_{DIRECT}(t)$ will be expressed as y(t) for convenience of explanation.

The self-interference signal y(t) is generated by the direct path between the transmit antenna 430 and the receive antenna 440. Accordingly, the self-interference signal canceling unit 450 according to another exemplary embodiment of the present invention physically and directly copies the self-interference signal generated by the direct path to generate an estimation signal ỹ(t) of the self-interference signal. This will be described in more detail with reference to FIG. 5.

Figure 5:
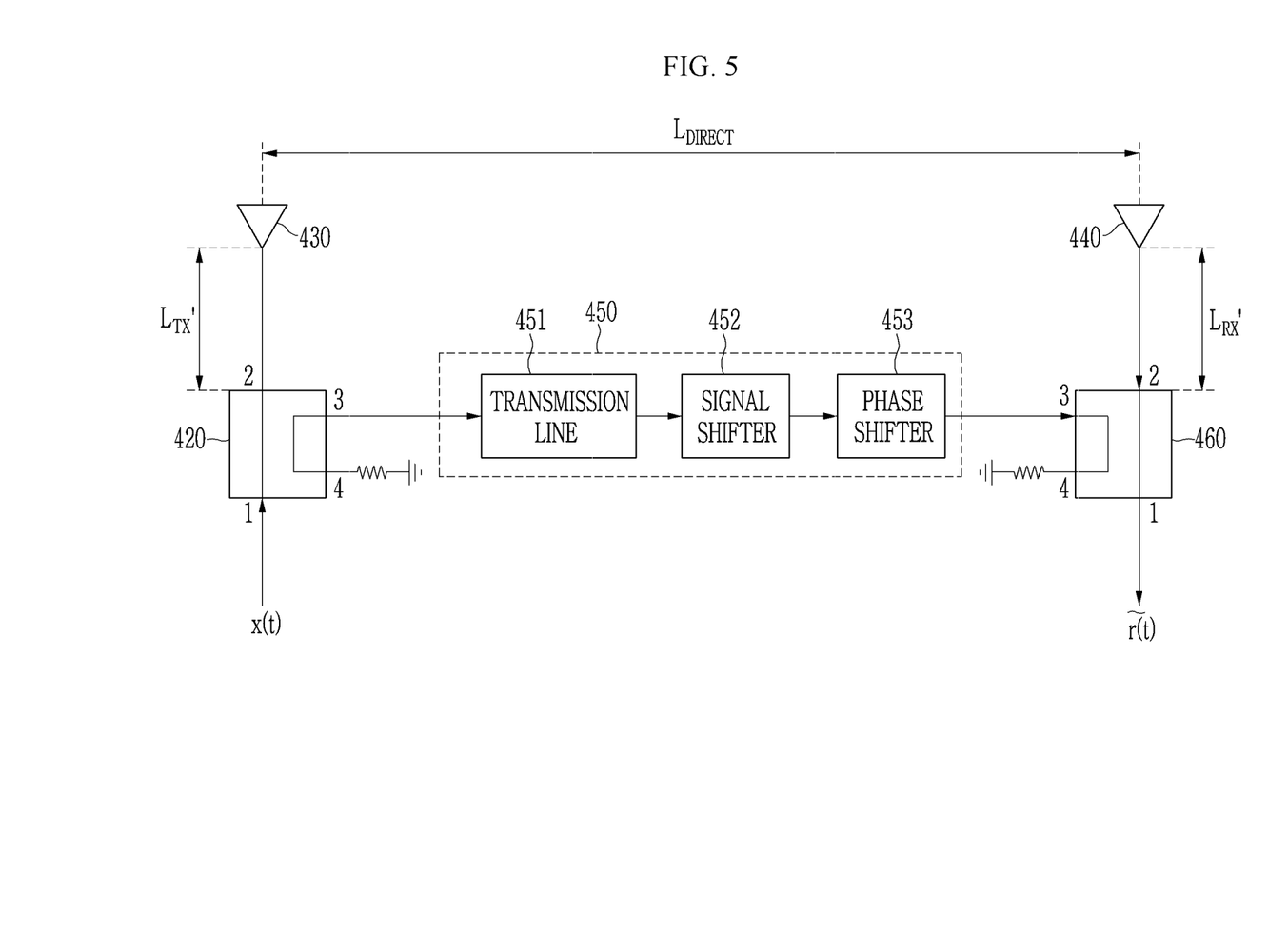
FIG. 5 is a drawing illustrating a self-interference signal canceling unit according to another exemplary embodiment of the present invention.

FIG. 5 is a drawing illustrating the self-interference signal canceling unit 450 according to another exemplary embodiment of the present invention. FIG. 5 illustrates the case that the divider 420 and the combiner 460 are implemented as the RF coupler. Here, 1, 2, 3, and 4, which are ports of the RF coupler, denote an input port, a through port, a coupled port, and an isolation port, respectively.

As illustrated in FIG. 5, the self-interference signal canceling unit 450 according to another exemplary embodiment of the present invention includes a transmission line 451, a signal shifter 452, and a phase shifter 453. The arrangement order of the transmission line 451, the signal shifter 452, and the phase shifter 453 may be changed.

Meanwhile, in the transceiver 400 according to another exemplary embodiment of the present invention, y(t) and ỹ(t) are expressed as in Equations 5 and 6, respectively.

$$y(t) = R_d \cdot x(t - \tau_d) \quad \text{[Equation 5]}$$

$$\tilde{y}(t) = R_e \cdot x(t - \tau_e) \quad \text{[Equation 6]}$$

In Equations 5 and 6, a difference between $R_d$ and $R_e$ is compensated by the signal shifter 452. In addition, a difference between $T_d$ and $T_e$ is compensated by 'transmission lines having physical lengths denoted by $L_{TX}'$ and $L_{RX}'$ and the transmission line 451'. The transmit signal x(t) is propagated to a path of the divider 420, the transmit antenna 430, the direct path between the transmit antenna 430 and the receive antenna 440, and the receive antenna 440 to become y(t), and the transmit signal x(t) is propagated to a path of the divider 420 and the self-interference signal canceling unit 450 to become ỹ(t). Accordingly, since y(t) and ỹ(t) have different propagation paths, a difference in the time delays may occur, where the 'transmission lines having the physical lengths denoted by $L_{TX}'$ and $L_{RX}'$' and the transmission line 453 serve to compensate for the difference between the time delays.

A function of the phase shifter 453 is the same as the phase shifter 154 of FIG. 2. That is, the phase is adjusted so that the estimation signal ỹ(t) of the self-interference signal is canceled from the signal w(t) inputted to the receive antenna 440.

Since the estimation signal ỹ(t) of the self-interference signal is generated by copying the physical phenomenon generating the self-interference signal in FIGS. 4 to 5, there is no need to basically estimate the channel impulse response $h_{DIRECT}(\tau, t)$ in Equation 4. However, in order to be able to estimate $h_{DIRECT}(\tau, t)$, the signal shifter 452 is turned-off by the control of a controller (not shown). That is, by turning-off the signal shifter 452, it is possible to estimate the channel impulse response $h_{DIRECT}(\tau, t)$.

Although the exemplary embodiments of the present invention described above describe the method for canceling the self-interference signal based on one transceiver, the exemplary embodiments may also be applied to the case that a plurality of transceivers are used. Here, the exemplary embodiments of the present invention may be applied to each of the plurality of transceivers based on one transceiver.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A transceiver comprising:
    a first antenna transmitting a portion of a transmit signal;
    a second antenna positioned to be spaced apart from the first antenna by a first length and receiving a receive signal;
    a self-interference signal canceling unit receiving a first signal, which is a portion of the transmit signal, and physically copying a self-interference signal generated by the first length to generate an estimation signal of the self-interference signal;
    a divider receiving the transmit signal and separating the first signal from the transmit signal to transmit the first signal to the self-interference signal canceling unit; and
    a combiner combining the second signal inputted through the second antenna with the estimation signal of the self-interference signal,
    wherein the self-interference signal canceling unit includes a transmission line having a predetermined length by considering a second length, which is a physical length between the divider and the first antenna, a third length, which is a physical length between the second antenna and the combiner, and the first length.

2. The transceiver of claim 1, wherein:
    the self-interference signal canceling unit further includes a signal shifter that adjusts magnitude of the first signal, so as to compensate for a magnitude difference between the self-interference signal and the estimation signal of the self-interference signal.

3. The transceiver of claim 1, wherein:
    the self-interference signal canceling unit further includes a phase shifter that adjusts a phase of the first signal so that the estimation signal of the self-interference signal is canceled from the second signal.

* * * * *